(No Model.) 2 Sheets—Sheet 1.
H. A. W. SMITH.
AGRICULTURAL IMPLEMENT.
No. 467,207. Patented Jan. 19, 1892.
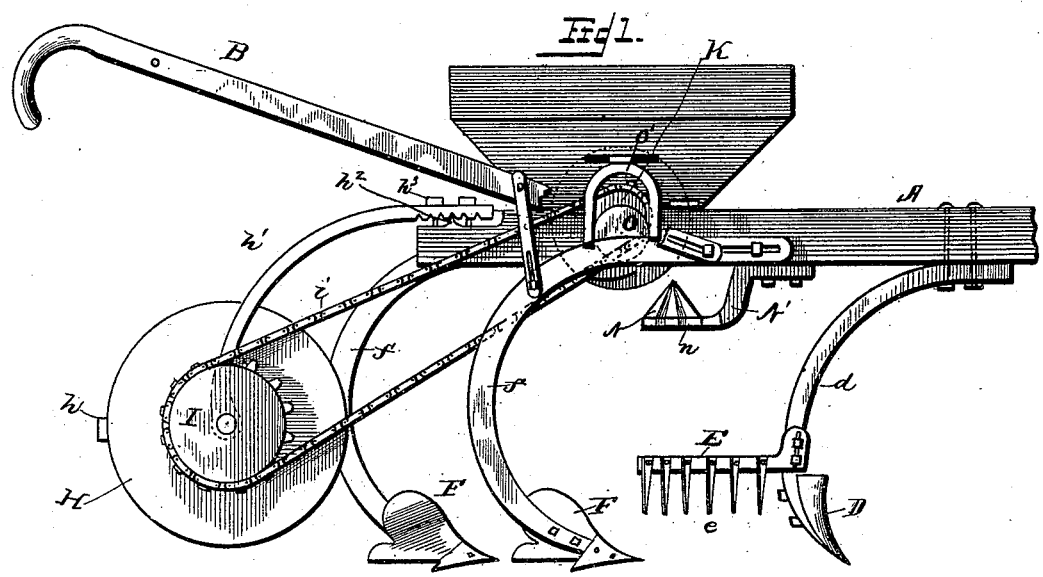
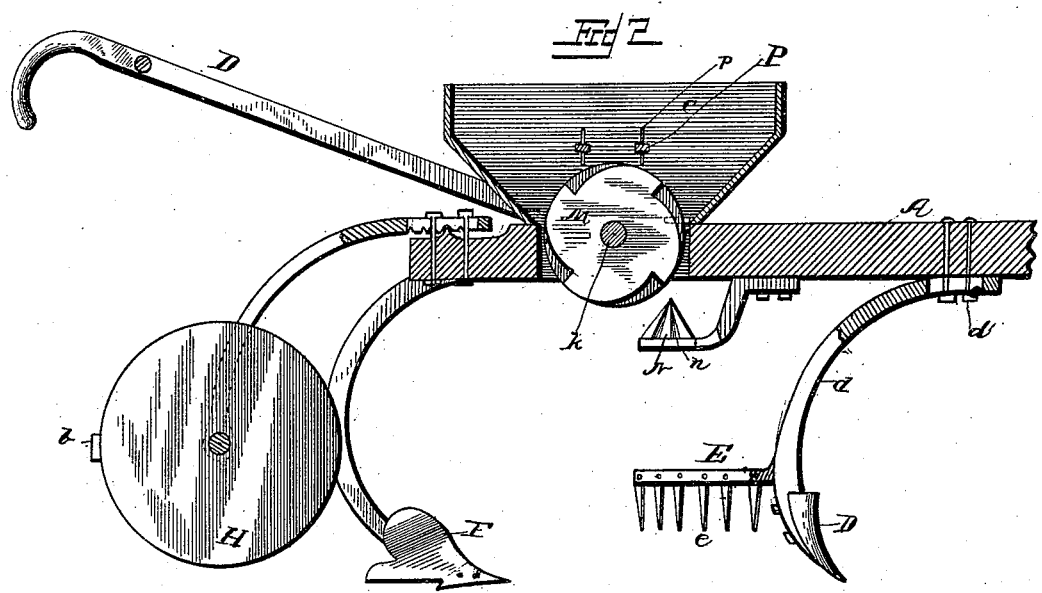
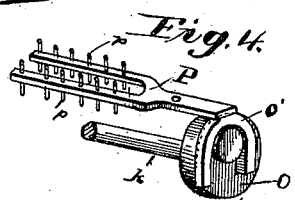
Witnesses:
J. M. Fowler Jr.
Alex Stewart
Inventor
Henry A. W. Smith
By Church & Church
his Attorneys

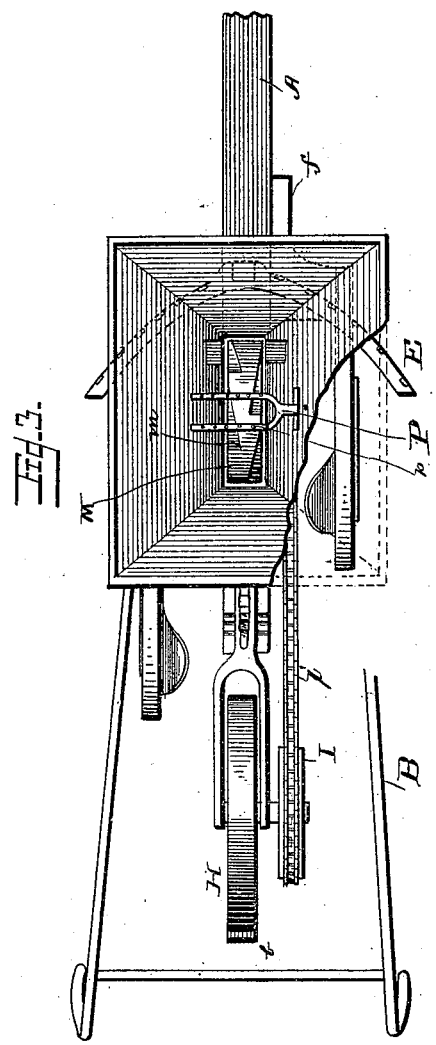

UNITED STATES PATENT OFFICE.

HENRY A. W. SMITH, OF MINNEOLA, VIRGINIA.

AGRICULTURAL IMPLEMENT.

SPECIFICATION forming part of Letters Patent No. 467,207, dated January 19, 1892.

Application filed August 18, 1891. Serial No. 403,006. (No model.)

*To all whom it may concern:*

Be it known that I, HENRY A. W. SMITH, of Minneola, in the county of Pittsylvania and State of Virginia, have invented certain new and useful Improvements in Agricultural Implements; and I do hereby declare the following to be a full, clear, and exact description of the same, reference being had to the accompanying drawings, forming a part of this specification, and to the letters of reference marked thereon.

This invention has for its object to provide an improved agricultural implement adapted particularly for preparing the ground after it has been plowed, &c., for the reception of tobacco-plants, which shall not only thoroughly break the ground and free it from roots, weeds, &c., but distribute fertilizer through the same, form the necessary hill, and mark the proper places for the plants.

With these objects in view the invention consists in certain novel details of construction and combinations and arrangements of parts to be hereinafter described, and pointed out particularly in the appended claims.

Referring to the accompanying drawings, Figure 1 is a side elevation of a machine constructed in accordance with my invention, with a portion of the nearest handle broken away to show the agitator-operating mechanism. Fig. 2 is a longitudinal vertical section, and Fig. 3 is a top plan view, of an implement constructed in accordance with my present invention. Fig. 4 is a detail perspective view of the agitator and connection.

Similar letters of reference in the several figures indicate the same parts.

Like other agricultural implements the present device is adapted to be drawn by animal or other power, at the same time remaining under the control of the husbandman, being for these purposes provided with a frame or beam A, to which the power is attached, carrying the main operating parts of the device, and handles B, projecting toward the rear and adapted to be grasped by the husbandman, who walks in rear of the machine. These handles are slotted for adjustment, as ordinarily, to accommodate persons of different stature.

On the main frame or beam A, at the base of the handles, is located a fertilizer-hopper C, having a discharge-orifice, feed-wheel, and complemental parts for evenly distributing fertilizer, as will be presently explained, and also secured to said frame and adapted to open a furrow immediately in front of the fertilizer-discharge opening is an opener D, which throws the soil out to each side. The opener D in the construction shown is supported on a standard $d$, adjustably connected with the frame by bolts $d'$, and at a point immediately above said opener said standard carries a cleaner and breaker E, having a series of downwardly-projecting and relatively closely-spaced teeth $e$, which, when the soil has been opened and thrown out to each side, comminutes the same and removes therefrom any sticks, stones, or other obstructions likely to injure the growing plants or prevent the formation of a perfect hill for their reception. This cleaner or breaker extends some distance outwardly and backwardly on each side, as shown in Fig. 3. When the soil has been thus treated by the opener and cleaner, the fertilizer is sown evenly over the same, and it is then hilled up by two lister-plows F F, both operating to turn the soil toward the center, mingle the fertilizer thoroughly therewith, and form a ridge or hill for the plants. The listers F are carried by adjustable standards $f$, secured on the ends of brackets $f'$, secured to the main frame, and in order to cause complete and perfect operation one of the listers is preferably located a short distance in advance of the other, causing the soil to be thrown up first from one side and then from the other. Running on the top of the hill or ridge thus formed and immediately in rear of the listers is a wheel H, having at a suitable point on its periphery a marker $h$, adapted to form a depression in the soil at the proper point for the reception of a plant. Besides serving as a marker, this wheel also operates the fertilizer-distributing mechanism by means of the sprocket-wheel I and drive-chain $i$, which passes around the second sprocket-wheel K on the feed-wheel shaft $k$. The marking-wheel is mounted on an adjustable standard $h'$, made adjustable for the purpose of varying its pressure upon the ground, enabling the opener and listers to be run at different depths, and also to permit of the tightening of the chain. This is accomplished by supporting the standard $h'$ on a knife-edge $h^2$ and passing bolts $h^3$ through the standard and into the frame on each side of the knife-edge, as will be readily understood.

Turning now to the fertilizer-distributing mechanism it will be seen that a feed-wheel M is employed having a series of wedge-shaped pockets $m$ on each side at the periphery, the pockets on one side alternating with and overlapping those on the opposite side. Thus when the wheel is rotated forward by means of the chain before referred to a practically-continuous feed of fertilizer is secured; but in order to prevent the fertilizer carried out by the feed-wheel dropping in masses I locate a scatterer N, consisting of a conical or pyramidal shaped block with the point immediately beneath the discharge-opening. Thus the fertilizer in its descent strikes said scatterer and is thrown off and evenly distributed over the portion of the soil previously treated by the opener and cleaner. This scatterer may have grooves or depressions $n$ passing down the same to more completely break and distribute the fertilizer, and it may be supported from the main frame in any suitable manner, as by a bracket N'. On the shaft $k$, and preferably outside of the sprocket-wheel K, is located a cam or eccentric O, embracing which is a forked lever or member $o'$, secured to the outer end of a pivoted agitator P, working above the feed-wheel and having a series of agitating-pins $p$, as shown clearly in Figs. 2 and 3. This agitator works through the wall of the hopper; but it is obvious that any other suitable means may be employed for agitating or disturbing the fertilizer immediately over the feed-wheel.

An implement constructed as thus described, it will be seen, enables the husbandman to prepare the soil completely for the reception of the plants at a single operation, the weeds, roots, stones, &c., being thrown to one side, the soil opened and disturbed to a good depth, comminuted, fertilizer distributed throughout evenly thereon, and finally the soil is hilled up and accurately marked at the places where the plants should be bedded.

Having thus described my invention, what I claim as new is—

1. In an agricultural implement such as described, the combination, with the main frame, fertilizer, and hopper carried thereby, of means for feeding the fertilizer, the centrally-arranged opener in advance of the fertilizer-feeder, the cleaner carried by the opener and projecting outwardly and rearwardly on each side, the pyramidal scatterer located beneath the discharge-orifice of the fertilizer-hopper, the two listers located on each side in rear of the fertilizer-feeder and operating to hill the soil up on a central line, and the marking-wheel in rear of the listers, substantially as described.

2. In an implement such as herein described, the combination, with the main frame, drive-wheel, fertilizer feed-wheel, its drive-shaft, and complemental parts, of the eccentric on said shaft, the pivoted agitator above the feed-wheel, and the yoke or bifurcated member carried by said agitator and embracing the eccentric, substantially as described.

HENRY A. W. SMITH.

Witnesses:
F. MARSHALL, Jr.,
W. B. SHEPHERD.